(12) United States Patent
Shirakawa

(10) Patent No.: US 6,901,172 B1
(45) Date of Patent: May 31, 2005

(54) METHOD AND APPARATUS FOR DRAWING LIKENESS

(75) Inventor: Yoichi Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 584 days.

(21) Appl. No.: 09/669,838

(22) Filed: Sep. 27, 2000

(51) Int. Cl.⁷ .................................................. G06K 9/36
(52) U.S. Cl. ........................ 382/284; 382/305; 345/630
(58) Field of Search .............................. 382/118, 115, 382/163, 170, 173, 199, 203, 232, 243, 256, 266, 267, 276, 282, 284, 285, 286, 289, 291, 293, 295, 305, 233, 283, 297, 307, 259; 345/630, 156, 629, 442, 589, 619, 639, 104, 152; 375/240.16; 348/601, 584; 446/98; 428/7; 352/54, 51, 50; 434/88

(56) References Cited

U.S. PATENT DOCUMENTS

| | | | | |
|---|---|---|---|---|
| 4,457,717 A | * | 7/1984 | Chika ........................... | 434/88 |
| 5,029,997 A | * | 7/1991 | Faroudja ....................... | 352/54 |
| 5,611,037 A | * | 3/1997 | Hayashi ....................... | 345/442 |
| 5,774,591 A | * | 6/1998 | Black et al. ................. | 382/236 |
| 5,779,516 A | * | 7/1998 | Thorne ......................... | 446/98 |
| 5,808,624 A | * | 9/1998 | Ikedo .......................... | 345/630 |
| 5,831,590 A | * | 11/1998 | Ikedo .......................... | 345/629 |
| 6,028,591 A | * | 2/2000 | Lueders ....................... | 345/156 |
| 6,088,396 A | * | 7/2000 | Takahashi ............... | 375/240.16 |
| 6,146,721 A | * | 11/2000 | Freynet .......................... | 428/7 |

FOREIGN PATENT DOCUMENTS

| | | |
|---|---|---|
| JP | 6-187413 | 7/1994 |
| JP | 6-266817 | 9/1994 |
| JP | 7-262398 | 10/1995 |
| JP | 7-262399 | 10/1995 |
| JP | 8-44893 | 2/1996 |
| JP | 8-44894 | 2/1996 |
| JP | 8-44895 | 2/1996 |
| JP | 8-44896 | 2/1996 |
| JP | 8-44897 | 2/1996 |
| JP | 8-44898 | 2/1996 |
| JP | 8-77379 | 3/1996 |
| JP | 8-305880 | 11/1996 |
| JP | 8-305881 | 11/1996 |
| JP | 9-319886 | 12/1997 |
| JP | 9-319887 | 12/1997 |
| JP | 9-319888 | 12/1997 |

* cited by examiner

*Primary Examiner*—Bhavesh M. Mehta
*Assistant Examiner*—Seyed Azarian
(74) *Attorney, Agent, or Firm*—Sughrue Mion, PLLC

(57) ABSTRACT

To draw fine facial expressions in the portrait by using portrait parts stored in a memory. The likeness drawing apparatus for creating a portrait by combining portrait parts is characterized in that the likeness drawing apparatus includes: a selection order input unit for inputting an ID of the part; a parts storage unit for storing the part IDs and part images as pairs; a parts selection unit for reading out a part image from the parts storage unit in accordance with the part ID; a deformation order input unit for inputting an order for deforming a part image by using movement, rotation, inversion, expansion, compression, or the like; an edition order input unit for inputting an order to additionally draw a segment, a dot train, or the like; a deformation movement computation unit for deforming and compiling an image fed from the parts selection unit in accordance with orders issued by the deformation order input unit and the edition order input unit; and a display unit for displaying a portrait created by the deformation movement computation unit.

11 Claims, 2 Drawing Sheets

F I G. 4
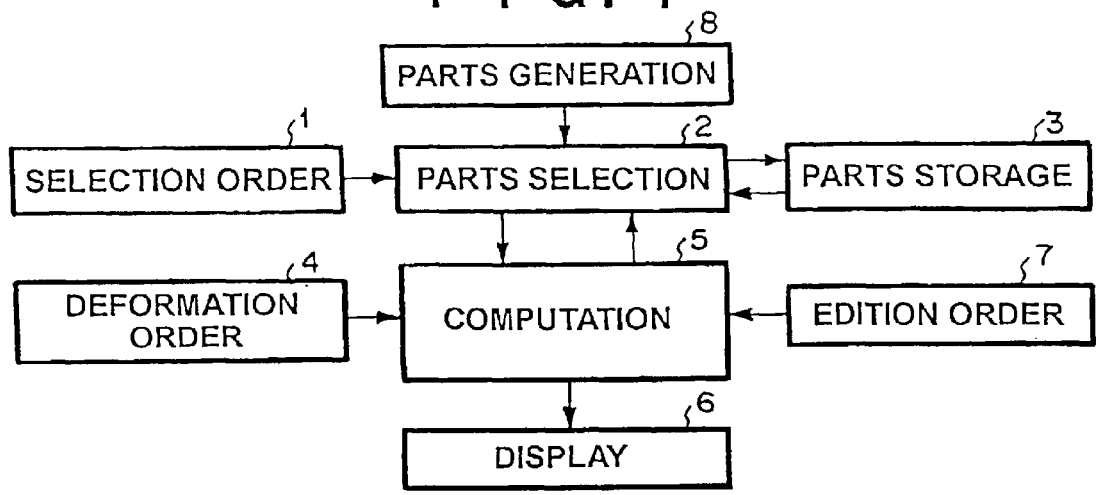
F I G. 5
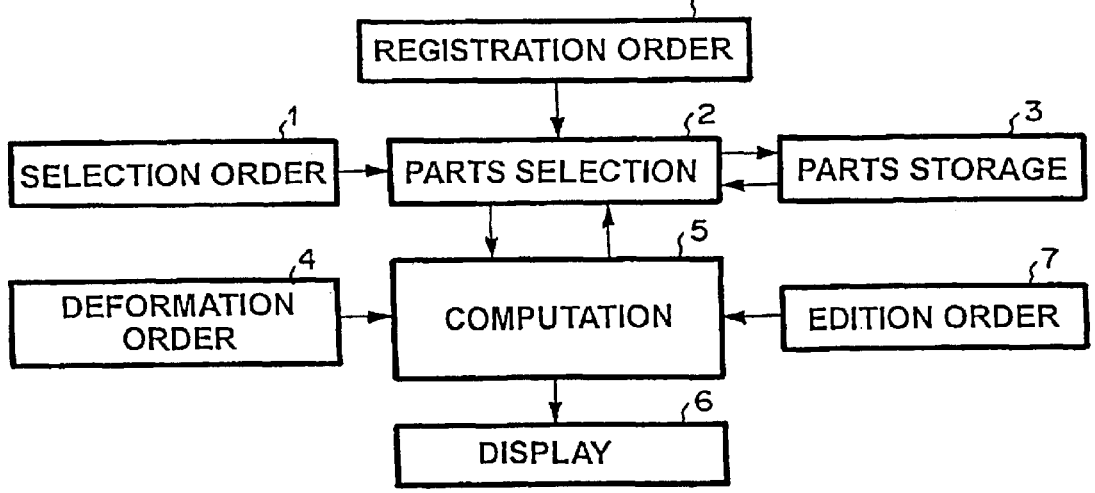
F I G. 6
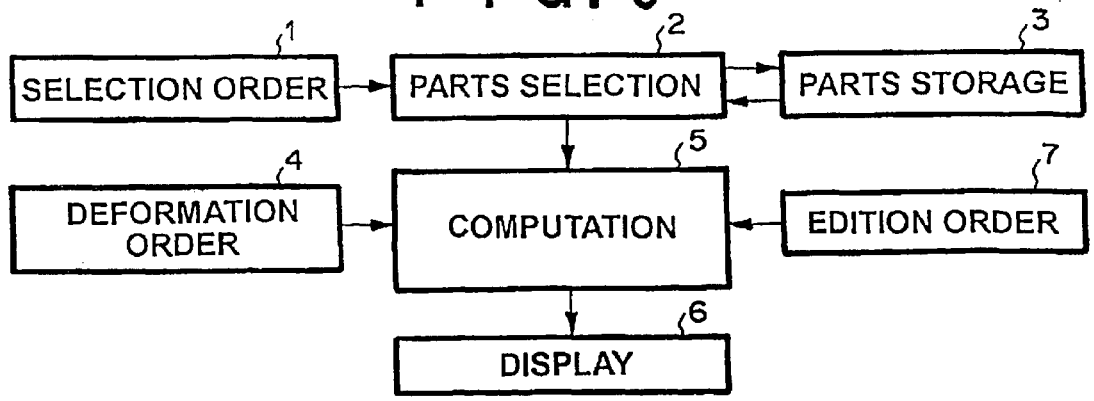

METHOD AND APPARATUS FOR DRAWING LIKENESS

BACKGROUND OF THE INVENTION

1. Technical Field of the Invention

The present invention relates to a likeness drawing apparatus for combining a plurality of regions of a face and creating a portrait, wherein parts of respective regions are, not merely deformed, but fine additional drawing is possible and deformation after the addition drawing is possible.

2. Description of Prior Art

Conventionally, in likeness drawing apparatuses, regions of a face, such as eyes, a nose, and a mouth, registered beforehand are combined and thereby a portrait is created.

Facial expressions in portraits or animations can be changed, while displaying images, according to JP 7-262399 A (1995) ( a first prior art). Concretely, when changing the expression of a color portrait, a basic image is firstly created by using a plurality of closed curves without colors, according to the first prior art. Subsequently, the boundary and inside of each of the closed curves forming the created basic image are painted out to form a color basic image. Subsequently, while watching this color basic image, the operator alters a selection number and selects deformation information. A closed curve of the basic image is deformed according to the deformation information. Subsequently, the deformed closed curve is painted out with a color. As a result, the expression of the color basic image is changed. Simply by having closed curve data, color data, and deformation data for changing the expression of the portrait, the expression of the portrait can be changed.

In the first prior art, the facial expression formed by combining parts of respective regions can be changed by forming closed curves corresponding to respective regions of the portrait, selecting colors within the closed curves, and painting out insides of the closed curves with the colors.

Furthermore, as a second prior art, a montage creation apparatuses are disclosed in JP 8-44894 A (1996), JP 8-44896 A (1996), and JP 8-44898 A (1996). An object of the second prior art is to make it possible to represent a wink and so on without increasing the capacity of the memory and without hampering the display quality even at the time of expansion and compression, further to make it possible to select a pattern without dividing the operator's image, and furthermore to make it possible to compare facial patterns to be selected.

Concretely, the montage creation apparatus described in the second prior art comprises: storage means for storing a plurality of patterns for each of parts of a face, such as hair, eyes, a nose, and a mouth; selection means for selecting a desired pattern of a desired part from the storage means; and montage image display means for displaying a montage image on a screen on the basis of the selected pattern or on the basis of outline data of the selected pattern; the selection means is characterized in that as regards paired left and right parts such as eyes and ears. Here, the selection means is formed so as to be switched to an independent selection mode for selecting only one of a pair or a simultaneous selection mode for selecting both of the pair simultaneously. Here, the selection means comprises: arbitrary point specification means for specifying an arbitrary point on a picture displaying the montage image; part discrimination means for discriminating a part corresponding to the specified point on the basis of a correspondence relation between a point specified by the arbitrary point specification means and a display position of each of parts forming the montage image; and selection start means for bringing the part discriminated by the part discrimination means into such a state that the pattern selection can be started from the storage means.

According to the first prior art, however, a closed curve cannot be formed easily especially in hair, eyebrow, eye contour, or the like. Furthermore, the inside of the closed curve is painted out with one color. When the closed curve is large, the expression of the portrait changes drastically and hence it is difficult to obtain a portrait having a fine facial expression. On the contrary, when the region of a closed curve is fine, it takes a lot of time to create the closed curve.

The second prior art aims at effectively selecting parts stored in the storage device, when creating a montage. Since only parts selection is conducted, representation of fine expression of a portrait depends upon data stored in the storage device. Furthermore, alteration of the expression or edition after selection of parts is not taken into consideration.

SUMMARY OF THE INVENTION

An object of the present invention is to represent fine expression of a portrait. Another object of the present invention is to make up for insufficiency of power of expression in a portrait which can be created, because in the prior art the number of parts in each region is limited because of a limited capacity of the storage device. Furthermore, in conventional likeness drawing apparatuses, the width of representation is expanded merely by conducting deformation operation such as expansion, compression, and rotation on individual parts. Therefore, still another object of the present invention is to make it possible to add fine segments and conduct deformation operation after addition of the fine segments in order to create a closely resembling portrait.

The likeness drawing apparatus of the present invention for creating a portrait by combining portrait parts comprises: a selection order input unit for inputting an ID of the part; a parts storage unit for storing the part IDs and part images as pairs; a parts selection unit for reading out a part image from the parts storage unit in accordance with the part ID; a deformation order input unit for inputting an order for deforming a part image by using any one of movement, rotation, inversion, expansion, and compression; an edition order input unit for inputting an order to additionally draw a segment, a dot train, or the like; a deformation movement computation unit for deforming and compiling an image fed from the parts selection unit in accordance with orders issued by the deformation order input unit and the edition order input unit; and a display unit for displaying a portrait created by the deformation movement computation unit.

The likeness drawing apparatus of the present invention for creating a portrait by combining portrait parts may comprises: a selection order input unit for inputting an ID of the part; a parts storage unit for storing the part IDs and part images as pairs; a parts selection unit for reading out a part image corresponding to the part ID from the parts storage unit; a deformation order input unit for ordering to deform a part image by using any one of movement, rotation, inversion, expansion, and compression; an edition order input unit for inputting an edition order of a segment, a dot train, or the like on the part image; a deformation movement computation unit for deforming, compiling and combining the part image in accordance with input orders of the deformation order input unit and the edition order input unit; and a display unit for displaying a portrait created by the deformation movement computation unit.

The likeness drawing apparatus of the present invention for creating a portrait by combining portrait parts may comprises: a selection order input unit for inputting an ID of a part; a parts storage unit for storing the part IDs and part images as pairs; a parts selection unit for reading out a part image corresponding to the part ID from the parts storage unit; an edition order input unit for inputting an edition order of a segment, a dot train, or the like on the part image; a deformation movement computation unit for compiling the part image inputted from the parts selection unit in accordance with an input order of the edition order input unit and composing each part image; and a display unit for displaying a portrait created by the deformation movement computation unit.

The likeness drawing method of the present invention for creating a portrait by combining portrait parts comprises the steps of: inputting an ID of a part of the portrait; reading out a part image from a parts storage unit for storing the part IDs and part images as pairs; inputting an order for deforming the part image by using any one of movement, rotation, inversion, expansion, and compression; inputting an edition order of a segment, a dot train, or the like on the part image; deforming and compiling the part image in accordance with the deformation order input and the edition order input; and displaying a result of the deforming and compiling.

According to the present invention, image edition processing such as pen drawing or an eraser can be conducted on each of selected parts. Deformation processing can be conducted on the edited parts as well. As a result, the power of representation of the "portrait" in likeness drawing can be increased.

In addition, deformation, such as movement, rotation, inversion, expansion or compression, of a part for a portrait can be effected. In addition, by effecting make up, addition, pen, or eraser, the expression of the portrait can be further edited. In both a portrait for montage photograph and a portrait of animation, expression can be obtained as the operator wishes.

Furthermore, owing to the deformation movement and edition of the "portrait," the number of part image data stored in the parts storage unit can be suppressed to a restricted value. As a result, a wide variety of portrait expressions can be represented without increasing the storage capacity unlimitedly and with a small storage capacity.

BRIEF EXPLANATION OF THE DRAWINGS

FIG. 4 is a configuration block diagram of an embodiment according to the present invention.

FIG. 5 is a configuration block diagram of an embodiment according to the present invention.

FIG. 6 is a configuration block diagram of an embodiment according to the present invention.

PREFERRED EMBODIMENTS OF THE INVENTION

[First Embodiment]

Figure 1:
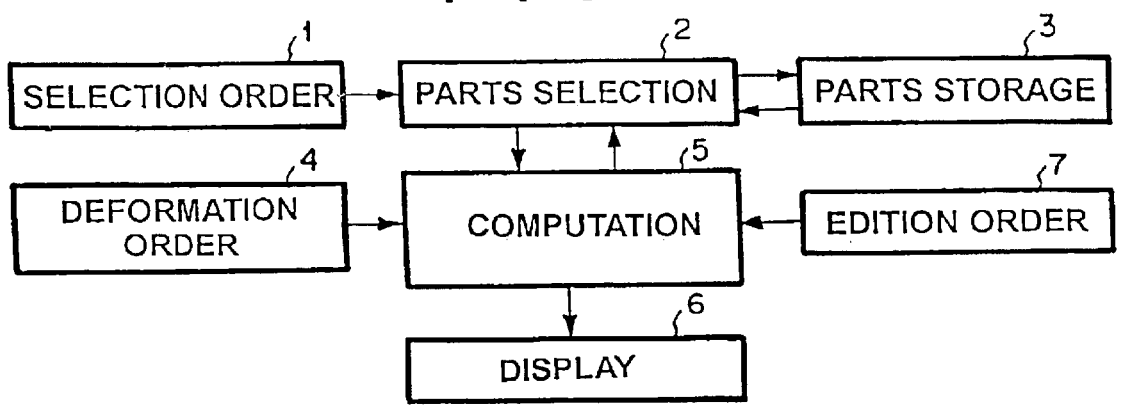
FIG. 1 is a configuration block diagram of an embodiment according to the present invention.

With reference to FIG. 1, a likeness drawing apparatus according to the present embodiment includes a selection order input unit 1, a parts selection unit 2, a parts storage unit 3, a deformation order input unit 4, a deformation movement computation unit 5, a part display unit 6, and an edition order input unit 7.

The selection order input unit 1 inputs an order of selecting an ID of a part to be displayed, as user's operation, and outputs the part ID to the parts selection unit 2.

The parts storage unit 3 stores IDs of respective regions of a portrait, for example, parts of a face, such as hair, eyes, a nose, a mouth, ears, and eyebrow, and part images associated with part IDs. Furthermore, as for the parts stored in the parts storage unit 3, it is also possible to add or correct a specific part from the input unit.

The parts selection unit 2 outputs the part ID obtained from the selection order input unit 1 to the parts storage unit 3, and obtains image data of the pertinent part.

The deformation order input unit 4 inputs an order of deformation, such as movement, rotation, inversion, expansion or compression, of a part as user's operation, and outputs it to the deformation movement computation unit 5.

On the basis of a part deformation value received from the deformation order input unit 4, the deformation movement computation unit 5 deforms a part image obtained from the parts selection unit 2 by using movement, rotation, inversion, expansion, or compression, and outputs the deformed part image to the part display unit 6.

Furthermore, the part display unit 6 displays images obtained from the deformation movement computation unit 5 by superposing the images for each of the regions.

The edition order input unit 7 inputs an order of a segment or dot train to be added, as user's operation, and outputs it to the deformation movement computation unit 5. The order of a segment or dot train is represented by, for example, a sequence of coordinates.

The deformation movement computation unit 5 conducts inverse transform of the part deformation value received from the deformation order input unit 4 on the segment or dot train received from the edition order input unit 7, and draws back the result to the parts selection unit 2 as an image. The image drawn back to the parts selection unit 2 is separated into parts of specific regions, and the parts are stored in the parts storage unit 3. As a result, the amount of storage of part data can be increased.

Furthermore, on the basis of the part deformation value received from the deformation order input unit 4, the deformation movement computation unit 5 deforms an image obtained from the parts selection unit 2 again, and outputs the result to the part display unit 6. As for the added parts as well, further deformation operation is thus made possible.

Input units such as the above described selection order input unit 1, deformation order input unit 4, and edition order input unit 7 can also be used, in the case where inputting is effected directly by using a keyboard, a mouse, or the like, and in the case where inputting is effected by using an FD (Floppy Disc) or an HD (Hard Disc). Individual input units may be provided, or one input device may be used as those input units.

Operation of the first embodiment will now be described by referring to FIGS. 1, 2 and 3.

The part ID fed from the selection order input unit 1 is supplied to the parts selection unit 2. At this time, if IDs of usable parts are restricted beforehand, the part ID can also be given by selection.

The parts selection unit 2 acquires an image of a part corresponding to the part ID from among parts stored in the parts storage unit. A concept diagram of the acquired image of hair part is shown in the left of FIG. 2. The image may also be stored in a memory included in, for example, the parts selection unit 2.

An order of deformation of a part by using movement, rotation, inversion, expansion, compression, or the like, fed from the deformation order input unit 4 is supplied to the deformation movement computation unit 5.

The deformation movement computation unit 5 acquires an image from the parts selection unit 2. On the basis of a deformation order supplied from the deformation order input unit 4, the deformation movement computation unit 5 deforms a part image. For example, processing of each of movement, rotation, inversion, expansion, and compression can be represented by a form of the following formula (1).

[Formula 1]

$$\begin{pmatrix} X_n \\ Y_n \end{pmatrix} = \begin{pmatrix} A & B \\ C & D \end{pmatrix} \begin{pmatrix} X_0 \\ Y_0 \end{pmatrix} + \begin{pmatrix} E \\ F \end{pmatrix} \quad (1)$$

Assuming that $X_0$ and $Y_0$ in the equation (1) are coordinates of each pixel of an image acquired from the parts selection unit 2 and $X_n$ and $Y_n$ are coordinates of each pixel of an image after deformation, A, B, C, D, E and F can be regarded as deformation orders. A and D can be regarded as orders of expansion and compression. E and F can be regarded as orders of translation.

Figure 2:
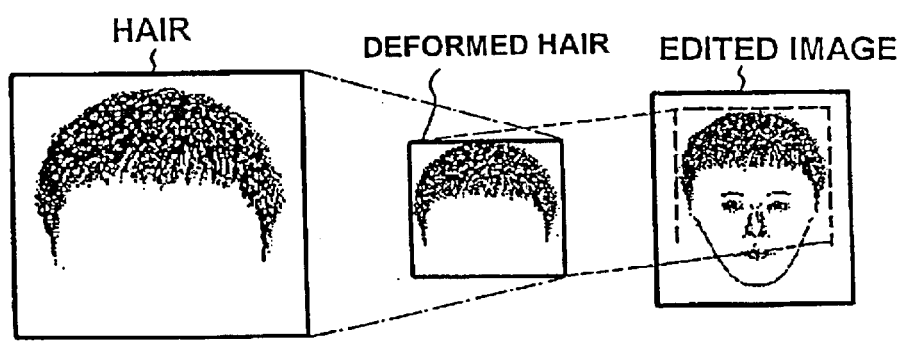
FIG. 2 is a model diagram of parts of a portrait according to the present invention.
Figure 3:
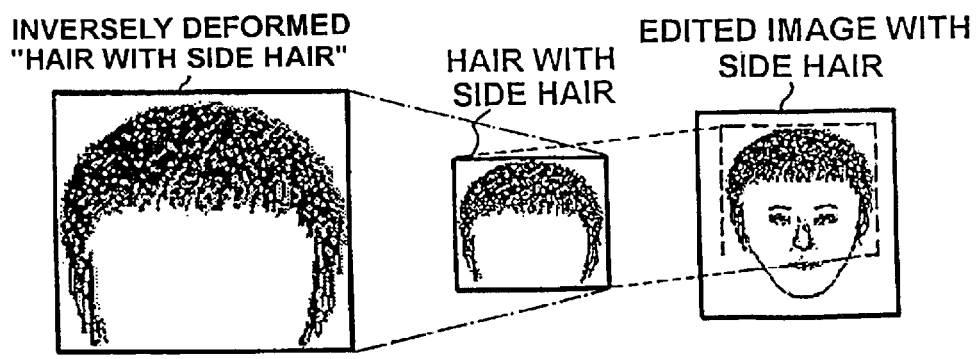
FIG. 3 is a model diagram of parts of a portrait according to the present invention.

For example, a concept diagram of an image compressed by a compression order is shown in the middle of FIG. 2. The image after deformation may also be stored in a memory included in, for example, the deformation movement computation unit 5.

The part display unit 6 receives the image deformed by the deformation movement computation unit 5 and displays it. Here, display of one part has been described. However, by conducting similar processing for each of regions of the face, a portrait is created. A concept diagram of a displayed image is shown in the right of FIG. 2. In the right of FIG. 2, hair part is displayed in an appropriate position. However, the hair may be displayed in a predetermined position. Or the above described translation orders E and F may be used as definition of display positions.

In the part display unit 6, part images of individual kinds may be stored in a memory every kind, and an image obtained by superposing them may be displayed.

An edition order supplied from the edition order input unit 7 is supplied to the deformation movement computation unit 5. At this time, the edition order is supplied in the form of, for example, coordinates of a segment or dot train. The edition order may be addition such as "pen drawing," or partial erasing such as "eraser." It is assumed that the discrimination is added. A concept diagram obtained when "pen drawing" is conducted on the "hair" part to add side hair is shown in the right of FIG. 3. As shown in FIG. 3, images of individual kinds are discriminated kind by kind.

The deformation movement computation unit 5 conducts inverse transform of deformation processing supplied from the above described deformation order input unit 4 on a segment or dot train, and outputs the image to the parts selection unit 2. For example, the inverse transform of the deformation can be represented by a form shown in the following formula (2).

[Formula 2]

$$\begin{pmatrix} X_0 \\ Y_0 \end{pmatrix} = \frac{1}{AD - BC} \begin{pmatrix} D & -B \\ -C & A \end{pmatrix} \left\{ \begin{pmatrix} X_n \\ Y_n \end{pmatrix} - \begin{pmatrix} E \\ F \end{pmatrix} \right\} \quad (2)$$

Assuming that A, B, C, D, E and F in the equation (2) are orders of deformation, $X_n$ and $Y_n$ can be regarded as coordinates of each pixel of edition operation obtained from the edition order input unit 7, and $X_0$ and $Y_0$ can be regarded as coordinates of each pixel of an image outputted to the parts selection unit 2. A concept diagram of the image drawn back is shown in the left of FIG. 3.

If the image of the parts selection unit 2 is updated, then the deformation movement computation unit 5 deforms the image of the parts selection unit 2 on the basis of an order of the deformation order input unit 4, and outputs the deformed image to the part display unit 6.

Relations between the numerical formulas and images will now be considered. For example, assuming that forward transform from the left of FIG. 2 to the middle of FIG. 2 is represented by the formula (1), it is found that inverse transform from the middle of FIG. 3 to the left of FIG. 3 is represented by the formula (2). In the above described embodiment, the portrait with side hair shown in the middle of FIG. 3 is obtained from the middle of FIG. 2 by edition order. In addition, hair with the side hair can be returned to the parts selection unit 2 by the inverse transform of the formula (2), and stored in the parts storage unit 3 as one of the portrait parts.

[Second Embodiment]

A second embodiment of the present invention will now be described by referring to drawing.

With reference to FIG. 4, a likeness drawing apparatus according to the second embodiment differs from the embodiment of FIG. 1 in that a part generation unit 8 is added.

Irrespective of parts stored in the parts storage unit 3, the part generation unit 8 newly creates a part, and outputs it to the parts selection unit 2. The new part may be a plain image having nothing drawn. The part generation unit 8 can create a part with an input device, such as a keyboard, a mouse, an FD, or an HD, and a display. The part generation unit 8 may be used in common with the selection order input unit 1, or may be used separately.

Operation according to the present embodiment will now be described hereafter. The operation of the present embodiment differs from the operation of the embodiment shown in FIG. 1 in that a part generated by the part generation unit 8 is used instead of using a part retrieved in the parts storage unit 3 or in addition to using it.

For example, in the case where "wrinkles," a "mole," or the like is not stored in the parts storage unit 3 beforehand, the part generation unit 8 generates a plain image, and outputs it to the deformation movement computation unit 5. It is assumed that an order of no deformation is supplied at this time from the deformation order input unit 4. For example, processing causing no deformation can be represented in such a form that A=D=1 and B=C=E=F=0 in the equation (1).

In the same way as the embodiment of FIG. 1, the deformation movement computation unit 5 outputs a segment or dot train to the parts selection unit 2 under an order given by the edition order input unit 7. The image drawn in the parts selection unit 2 is displayed on the part display unit 6 again via the deformation movement computation unit 5.

Even if a part is not stored in the parts storage unit 3, it thus becomes possible to newly conduct "pen drawing." In the case where "wrinkles," a "mole," or the like is not stored in the parts storage unit 3 beforehand and "wrinkles" are to be added, a part "wrinkles" may be generated by the part generation unit 8 and stored in the part generation unit 8. The part "wrinkles" is superposed on, for example, the part of "forehead" to represent expression of "forehead" with "wrinkles" added thereto. Furthermore, in the case of a "mole," a "mole" is generated by the part generation unit 8 and superposed on, for example, the part of "chin." New representation of the "chin" with the "mole" added thereto can thus be obtained. Furthermore, in the part generation unit 8, "rouge," "false eyelashes," or the like can also be generated. Colorful portrait expressions can thus be generated.

Owing to the part generation unit 8, parts of a portrait can be generated easily in accordance with the application program of a CPU. By using peculiar utility, such as, for example, nonstandard creation utility in a word processor, therefore, it is consequently effective to creation of new expression in a short time.

[Third Embodiment]

A third embodiment of the present invention will now be described by referring to drawing. With reference to FIG. 5, the present embodiment differs from the first embodiment shown in FIG. 1 in that a registration order input unit 9 is added.

The registration order input unit 9 issues an order to newly generate a part ID for an image stored in storage means included in the parts selection unit 2 and store the part ID in the parts storage unit 3.

In this case, the parts selection unit 2 associates the stored image with the part ID obtained from the registration order input unit 9, and outputs the result to the parts storage unit 3. The parts storage unit 3 stores the part ID obtained from the parts selection unit 2 and the part image in association with each other.

Hereafter, operation of the present embodiment will be described. The operation of the present embodiment is the same as the first embodiment shown in FIG. 1 as far as the image output operation from the deformation movement computation unit 5 to the parts selection unit 2 under an order of the edition order input unit 7.

It is now assumed that at this time a "pen drawn" part as shown in FIG. 3(a) obtained by adding side hair to "hair" of the part ID read out from the parts storage unit 3 is stored in the parts selection unit 2 beforehand.

The parts selection unit 2 registers the part ID obtained from the registration order input unit 9, and the image stored in the parts selection unit 2, in the parts storage unit 3 in association with each other.

In this way, an image obtained by effecting addition on an existing part can be registered as a new part. It becomes possible to call this part by using the part ID and use it from the next time on. [Fourth Embodiment]

A fourth embodiment of the present invention will now be described. With reference to FIG. 6, the present embodiment differs from the first embodiment shown in FIG. 1 in that drawing back from the deformation movement computation unit 5 to the parts selection unit 2 is not effected under an order obtained from the edition order input unit 7. In other words, a result of likeness drawing created in the deformation movement computation unit 5 is not registered in the parts storage unit 3 together with the part ID. Thus the present embodiment has a one-way configuration.

Hereafter, operation of the present embodiment will be described. A part ID fed from the selection order input unit 1 is supplied to the parts selection unit 2. The parts selection unit 2 acquires a part image corresponding to the part ID from among the parts stored in the parts storage unit 3. The part image may also be stored in a memory included in, for example, the parts selection unit 2.

An order of deformation of a part by using movement, rotation, inversion, expansion, compression, or the like, fed from the deformation order input unit 4 is supplied to the deformation movement computation unit 5.

The deformation movement computation unit 5 acquires a part image from the parts selection unit 2. On the basis of a deformation order supplied from the deformation order input unit 4, the deformation movement computation unit 5 deforms the part image by using movement, rotation, inversion, expansion, compression, or the like of the part. The deformed image may be stored in a memory included in the deformation movement computation unit 5.

Subsequently, the part display unit 6 receives the image deformed by the deformation movement computation unit 5 and displays it. Up to this point, the operation is the same as that of the first embodiment shown in FIG. 1.

An edition order fed from the edition order input unit 7, such as the order of edition for adding side hair, is supplied to the deformation movement computation unit 5.

The deformation movement computation unit 5 adds an image based on a given segment or dot train to an image stored in the deformation movement computation unit 5, and simultaneously outputs it to the part display unit 6 as well. If the part edited in image is not subjected to expansion, compression, or rotation processing but subjected to only translation processing, then an effect similar to that of the embodiment of FIG. 1 is obtained even when mounting shown in the present embodiment is conducted.

In other words, the configuration can be simplified. In addition, a portrait can be represented as wished to some degree, and the expression of the portrait can be represented as expected.

In the above described embodiments, only the part display unit 6 has been described as the display unit. In the case of operations in input units: the selection order input unit 1, the deformation order input unit 4, the edition order input unit 7, and the registration order input unit 9, however, it is inconvenient without a display and there is an operation mistake. Therefore, there is provided such a display that the display contents can be altered in the lump in accordance with the action in operation. In the above described embodiments, therefore, a display device such as a liquid crystal panel or a CRT tube which is not illustrated is connected in FIGS. 1, 4 to 6.

What is claimed is:

1. A likeness drawing apparatus for creating a portrait by combining portrait parts, which comprises:
   a selection order input unit for inputting one or more identifiers (IDs) of the portrait parts;
   a parts storage unit for storing said IDs and images of said portrait parts;
   a parts selection unit for reading out said images in accordance with said ID;

a deformation order input unit for inputting deformation orders for deforming said images by selecting at least one operation among movement, rotation, inversion, expansion, and compression;

an edition order input unit for inputting edition orders, in the form of a sequence of coordinates of at least one of a segment and a dot train, to edit dots and/or said segment and/or said dot train;

a computation unit for forming and editing said images in accordance with said deformation orders and said edition orders;

and a display unit for displaying a portrait created by said computation unit.

2. The likeness drawing apparatus according to claim 1, which further comprises a registration order input unit for inputting registration identifiers (IDS), wherein:

said computation unit returns deformed images of said portrait parts to said parts selection unit;

said parts storage unit stores said deformed images together with said registration IDs for said deformed images.

3. The likeness drawing apparatus according to claim 1, which further comprises a parts generation unit connected with said parts selection unit, wherein:

said parts generation unit generates new portrait parts and new portrait parts identifies (IDs); and said parts storage unit stores said new portrait parts and said new portrait parts identifies (IDs).

4. The likeness drawing apparatus according to claim 1, wherein said computation unit:

selects one or more parts in the created portrait:

executes inverse transformation on the basis of said deformation orders:

transfers the result of said inverse transformation to said parts selection unit;

deforms said result of said inverse transformation on the basis of another deformation orders.

5. A likeness drawing apparatus for creating a portrait by combining portrait parts, which comprises:

a selection order input unit for inputting one or more identifiers (IDs) of the portrait parts;

a parts storage unit for storing said IDs and images of said portrait parts;

a parts selection unit for reading out said images in accordance with said ID;

a deformation order input unit for inputting deformation orders for deforming said images by selecting at least one operation among movement, rotation, inversion, expansion, or compression;

an edition order input unit for inputting edition orders, in the form of a sequence of coordinates of at least one of a segment and a dot train, to edit dots and/or said segment and/or said dot train;

a computation unit for deforming and editing said images in accordance with said deformation orders and said edition orders;

and a display unit for displaying a portrait created by said computation unit.

6. A likeness drawing apparatus for creating a portrait by combining portrait parts, which comprises:

a selection order input unit for inputting one or more identifiers (IDs) of the portrait parts;

a parts storage unit for storing said IDs and images of said portrait parts;

a parts selection unit for reading out said images in accordance with said ID;

an edition order input unit for inputting edition orders, in the form of a sequence of coordinates of at least one of a segment and a dot train, to edit dots and/or said segment and/or said dot train;

a computation unit for deforming and editing said images in accordance with said edition orders;

and a display unit for displaying a portrait created by said computation unit.

7. A likeness drawing method for creating a portrait by combining portrait parts, which comprises the steps of:

inputting an identifier (ID) of a part of said portrait;

reading out an image of said part from a parts storage unit for storing pairs of said part IDs and part images;

inputting an order for deforming said image by using at least one operation among movement, rotation, inversion, expansion, and compression;

inputting an edition order, in the form of a sequence of coordinates of at least one of a segment and a dot train, for editing dots and/or said segment and/or said dot train on said image;

deforming and editing said image in accordance with said deformation order and said edition order, and displaying a result of said deforming and editing.

8. The likeness drawing apparatus according to claim 1, wherein said edition order input unit is a unit for inputting the edition order to edit a segment and/or dot train on images of parts by addition or partial erasing.

9. The likeness drawing method according to claim 7, wherein said step of inputting edition order is a step of inputting the edition order to edit a segment and/or dot train on images of parts by addition or partial erasing.

10. The likeness drawing apparatus according to claim 5, wherein said edition order input unit is a unit for inputting the edition order to edit a segment and/or dot train on images of parts by addition or partial erasing.

11. The likeness drawing apparatus according to claim 6, wherein said edition order input unit is a unit for inputting the edition order to edit a segment and/or dot train on images of parts by addition or partial erasing.

* * * * *